July 14, 1953 J. HARTZ 2,645,710

RADIO TRANSMISSION AND CARRIER WAVE MODULATION

Filed March 12, 1948 2 Sheets-Sheet 1

INVENTOR:

Julius Hartz

July 14, 1953 J. HARTZ 2,645,710

RADIO TRANSMISSION AND CARRIER WAVE MODULATION

Filed March 12, 1948 2 Sheets-Sheet 2

INVENTOR:

Julius Hartz

Patented July 14, 1953

2,645,710

UNITED STATES PATENT OFFICE 2,645,710

RADIO TRANSMISSION AND CARRIER WAVE MODULATION

Julius Hartz, New Orleans, La.

Application March 12, 1948, Serial No. 14,493

3 Claims. (Cl. 250—6)

This invention relates to a new and improved method of carrier wave modulation, and more particularly, to a continuous current system in which anode current flows for the full 360 degrees of the carrier cycle in contradistinction to all other known methods in which the anode current flows for varying portions of the carrier cycle. It also relates to the method of generating, transmitting and receiving an alternately polarized with respect to a zero-current X-axis carrier frequency, which, when modulated, contains varying amounts of alternately polarized direct-current components.

*Continuity vs. discontinuity.*—In the beginning, "wireless telegraphy" consisted in transmitting varying lengths of discontinuous carrier trains, which could not be modulated by voice or music. When the invention of the tube made practical the generation of continuous waves, the first element of continuity had been solved. However, modulation (of amplitude) has remained a discontinuous process: The telegraph key is used to turn the waves on and off, while voice currents are used in conjunction with non-linear elements so as to allow the anode current or currents to flow for only partial periods of the carrier cycle, depending upon the instantaneous amplitude desired. In a single-ended circuit, which polarizes in only one direction, a single current or currents in phase quadrature will produce discontinuous pulses. If non-linear elements are polarized in two directions, a single current may be made to pass through both of them, or currents in phase quadrature can be arranged so that one current passes through one non-linear element and the other current passes through the second non-linear element. When modulated, this also produces discontinuity. The discontinuity here referred to concerns those modulating systems where anode currents are flowing for only varying portions of the carrier cycle and where there are finite periods of various length when no anode current is flowing.

In the present invention, four or six non-linear elements are arranged in push-pull parallel and double or triple phase currents are made to flow through them so that each current passes through two of the non-linear elements, hence the resulting currents are continuous to overlapping throughout the carrier cycle even when modulated. The resulting modulated currents are then fed to a class-B amplifier, whose function is to "alternately polarize" with respect to a zero-current X-axis the carrier which is to be transmitted.

Further explanation can best proceed in connection with the drawings, in which.

Figures 1, 5:
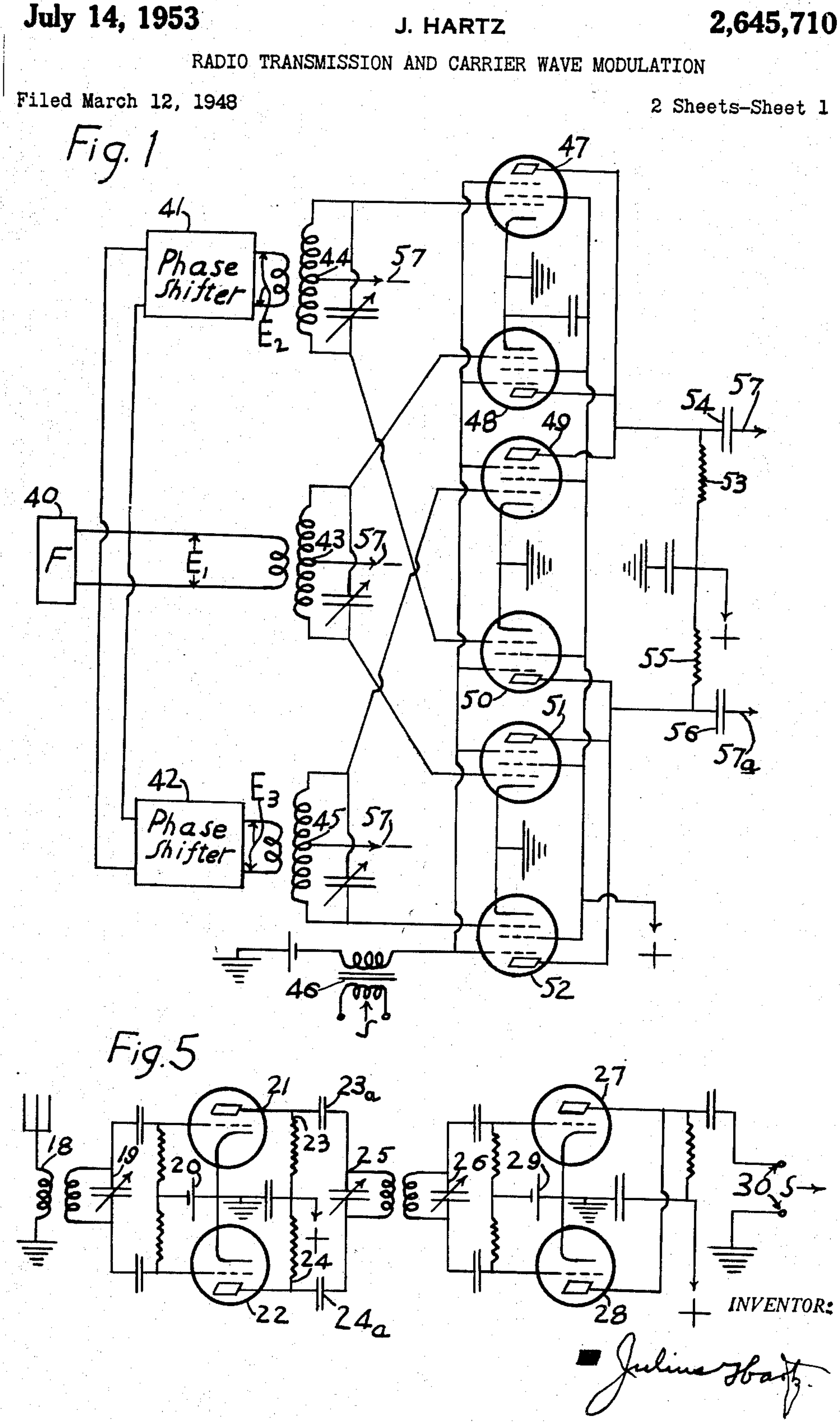
Fig. 1 is a circuit diagram showing the method of modulating a three-phase current.
Fig. 5 is a circuit diagram of a receiver.

Referring to Fig. 1, reference numeral 40 is a radio frequency source of frequency F, furnishing currents of normal phase through the center-tapped transformer 43 counter phasally to the grids of tubes 48 and 51, furnishing currents whose phase has been retarded 60 degrees by the phase shifter 41 to the center-tapped transformer 44 connected to the grids of tubes 47 and 50, and furnishing currents whose phase has been advanced 60 degrees by the phase shifter 42 to the center-tapped transformer 45 connected to the grids of tubes 49 and 52, all of which input circuits are tuned to the frequency F. The anodes of tubes 47, 48 and 49 are connected in parallel and through a single-side resistance 53 capacity 54 coupling to the output terminal 57. The anodes of tubes 50, 51 and 52 are connected in parallel and through a single-side resistance 55 capacity 56 coupling to the other output terminal 57–*a*. The tubes 47, 48, 49, 50, 51 and 52 are biased class-C by the negative bias source 57 in such a manner as to allow the different anode currents to be continuous to overlapping at all times when modulated. Modulating currents S are cophasally impressed through the modulating transformer 46 upon the suppressor grids of all the tubes 47, 48, 49, 50, 51 and 52.

Upon looking at Fig. 1, it will be obvious to any one versed in the art that current of one phase might have been omitted and only two currents in phase quadrature might have been modulated. Because this has been illustrated in detail in applicant's copending Ser. 588,386, filed April 14, 1945, and now abandoned, no detailed repetition is deemed necessary.

Again referring to Fig. 1, it will be observed that the three currents are labeled $E_1$, $E_2$ and $E_3$.

Figure 4:
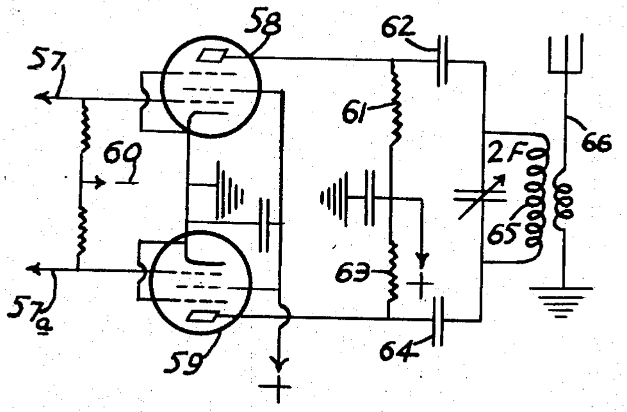
Fig. 4 is a circuit diagram of the class-B amplifier used to "alternately polarize" with respect to a zero-current X-axis the carrier.
Figure 3:
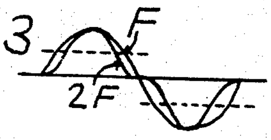
Fig. 3 illustrates the difference between a "sinusoidal" frequency F, and an "alternately polarized" with respect to a zero-current X-axis frequency 2F.

Fig. 4 is a class-B amplifier used to "alternately polarize" with respect to a zero-current X-axis the carrier. In detail, currents modulated by the "continuous anode current system" are fed to connectors 57 and 57–*a* and on to the grids of tubes 58 and 59. The anode of tube 58 is connected through a single-side resistance 61 capacity 62 coupling to one side of an inductance 65 tuned to the frequency 2F. The anode of tube 59 is connected through a single-side resistance 63 capacity 64 coupling to the opposite side of the inductance 65, which inductance is coupled to the radiator 66. Tubes 58 and 59 are biased class-B by the negative bias source 60. In saying that the output circuit 65 is tuned to the frequency 2F, it is always assumed that the input frequency to connectors 57 and 57–*a* will be regarded as frequency F. Fig. 3 was drawn to help illustrate this: "Sinusoidal" frequency F defined by the mathematical equation $i=I \sin \theta$ becomes "alternately polarized" with respect to a zero-current X-axis frequency 2F defined by the mathematical equation $i=I \sin^2 \theta$, where $i$ is the R-F instantaneous current, I the magnitude of the peak current, and $\theta$ the instantaneous phase angle, a function of time, in both of the above quoted equations. A sine wave varies per the sine of the angle. The uni-directionally self-modulated carrier of this system varies per the sine-squared of the angle. Since the input frequency to terminals 57 and 57–*a* of Fig. 4 is not a sinusoid at all times, it is well to point out that a cycle is defined as the time in which a succession of events is completed and then returns in the same order: As measured by this definition a circuit tuned to an "alternately polarized" frequency is always tuned to twice the frequency as ordinarily defined.

This invention constitutes the basic discovery of the method of continuous-anode current generation of, and transmission of a modulated and "alternately polarized" with respect to a zero-current X-axis carrier frequency containing with reference to a zero-current X-axis varying amounts of alternately polarized direct-current components, which is accomplished by the use of a circuit designed to separately amplify at all the necessary frequencies and resistance-capacity coupling the oppositely polarized single-side amplifiers to the tuned inductance to avoid the loss of the direct-current components through the zero impedance of a center-tapped inductance.

Fig. 4 somewhat resembles a conventional push-pull modulator from which it differs radically, however, by reason of the fact that current flows through tube 58 for 180 degrees of time and then through tube 59 for 180 degrees of time—at all times. There is never any finite period of anode current cut-off.

Figure 6:
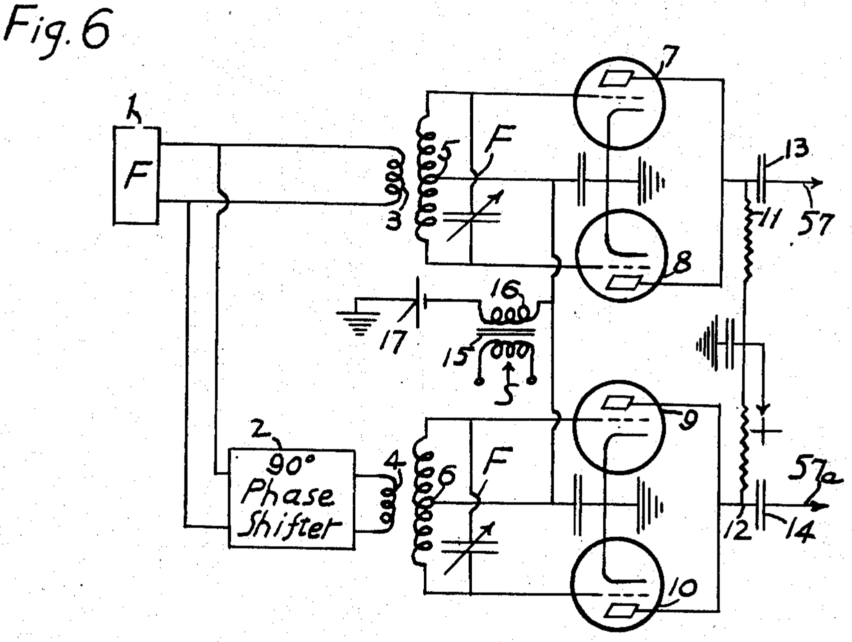
Fig. 6 is a circuit diagram showing one method of modulating two currents in phase quadrature.

Fig. 6 shows how two currents in phase quadrature might be modulated so that the anode currents would be continuous to overlapping throughout the carrier cycle even when modulated. Reference numeral 1 is a source of radio frequencies of frequency F, furnishing currents of normal phase through the transformer 3 and the center-tapped secondary 5 counterphasally to the grids of tubes 7 and 8; and furnishing phase shifted currents through the ninety-degree phase shifter 2, the transformer 4 and the center-tapped secondary 6 to the grids of tubes 9 and 10, both of which transformer circuits are tuned to the frequency F. The anodes of tubes 7 and 8 are connected in parallel and through a single-side resistance 11 capacity 13 coupling to the output terminal 57. The anodes of tubes 9 and 10 are connected in parallel and through a single-side resistance 12 capacity 14 coupling to the other output terminal 57–*a*. Modulating currents S are cophasally impressed through the modulating transformer 15 and the secondary 16 upon the grids of all the tubes 7, 8, 9 and 10, which tubes are all biased class-C by the "C" battery 17, the average bias being such that anode current will not cease to flow for any finite period of time during modulation.

Referring to Fig. 5, in detail, 18 is a receiving antenna coupled to the tuned circuit 19 which furnishes counterphasally intercepted energy to the grids of tubes 21 and 22. These tubes are biassed class-B (I repeat class-B) by the C-battery 20. The anode of tube 21 is coupled through the single-side amplifier consisting of resistance 23 and capacity 23–*a* to one side of a tuned circuit 25. The anode of tube 22 is coupled through the single-side amplifier consisting of resistance 24 and capacity 24–*a* to the other side of the tuned circuit 25 which circuit is tuned to twice the recognized frequency of the carrier to be received, the details of which were previously discussed in the chapter dealing with Fig. 4. It is necessary that the anode circuit be resistance capacity coupled to the tuned circuit 25 in the manner shown in order to preserve the alternately polarized with respect to a zero-current X-axis, direct-current components previously described component. In the case of the input circuit 19 this could be composed of a center-tapped transformer if no direct-current is allowed to flow in this circuit, which would represent normal operation. Tubes 21 and 22 are biassed class-B in order to preserve the "alternate polarization" with respect to a zero-current X-axis of the direct-current flow. From the tuned circuit 25 energy passes to the circuit 26 of detecting tubes 27 and 28, which tubes are biassed by the C-battery 29 in a manner suitable for detection. The anodes of tubes 27 and 28 are connected in parallel and resistance-capacity coupled to the output 30 where the signal frequency is available. The receiving circuit here illustrated is confined to the bare essentials, as, of course, any number of stages of amplification might be used, and, within the limitations pointed out in the description, the more conventional methods could be utilized. The three-element tubes are only by way of illustration, as the method of employing multi-grid tubes is too well known to all persons versed in the art to need description.

The transmitter or receiver of this invention is not limited to the particular embodiment described, but it will of course be understood that the illustrative systems and apparatus may be variously modified without departing from the spirit and scope of the invention. Furthermore, although in the description, grid modulation was illustrated, it is not intended to limit the scope of the invention only to grid modulation, for other types of modulation may be employed, as is well known to anyone versed or skilled in the art, and these, therefore, require no detailed description. Regardless of what other characteristics a transmission and receiving system may have, if it utilizes the continuous anode current method and/or contains a method of generating and preserving alternately polarized with respect to a zero-current X-axis direct-current components and/or of transmitting an alternately polarized with respect to a zero-current X-axis carrier, then it is making use of the method and knowledge herein revealed.

It is desired to point out that both the transmitter and the receiver as herein revealed constitute just one invention. There is absolutely nothing different about my receiver and any ordinary push-pull receiver with the exception that the tuned anode circuit is resistance-capacity coupled to the anodes, instead of using a center-tapped inductance as is customary, and the relays are biassed class-B. The tuned anode circuit of the transmitter is also resistance-capacity coupled (in the same manner) to the tube anodes (which relays are also biassed class-B) and the reason for so coupling in both the transmitter and the receiver is identical—to preserve the direct-current component which is alternately polarized with respect to a zero-current X-axis—or to make Ohm's law apply for both direct-current and alternating current components—and there is only one single invention involved in either case. Transmitter and receiver are both biassed class-B for the purpose of "alternately polarizing" with respect to a zero-current X-axis the carrier.

I claim as my specific invention:

1. In a communication system a source of oscillations, three separate paths energized by said source, two of said paths each including a phase shifter, three pairs of vacuum tubes comprising each a cathode, a first control grid, a second control grid and an anode, means coupling each of said paths to the first control grids of one of said pairs in push-pull relation, a bias source coupled to each of said first control grids, modulating means connected cophasally to the second control grids of all of said tubes, a common load circuit for all of said pairs including a resistance-capacity network, means for coupling the anodes of each of said pairs in push-pull relation to said common load, a further pair of vacuum tubes including a cathode, a control grid and an anode each, means connecting said common load in push-pull relationship to the control grids of the tubes of said further pair, a bias source coupled to the control grids of said further pair for biasing class-B, a tuned circuit tuned to twice the frequency of said source, a resistance-capacity network coupled to each of the anodes of said further pair and connecting said anodes to said tuned circuit in push-pull relation, and means for radiating the signal energy present in said tuned circuit; means for receiving the radiated energy including a second tuned circuit, a pair of vacuum tubes each including a control grid and an anode, a resistance-capacity network coupling said second tuned circuit to said last mentioned control grids in push-pull relation, a third tuned circuit, a resistance-capacity network coupling said last-mentioned anodes to said third tuned circuit in push-pull relation and detecting means coupled in push-pull relation to said third tuned circuit.

2. In a communication system a source of oscillations, two separate paths energized by said source, one of said paths including a phase shifter, two pairs of vacuum tubes comprising each a cathode, at least one control grid and an anode, means coupling each of said paths to the control grids of one of said pairs in push-pull relation, a bias source coupled to each of said control grids, modulating means connected cophasally to the control grids of all of said tubes, a common load circuit for both of said pairs including a resistance-capacity network, means for coupling the anodes of each of said pairs in push-pull relation to said common load, a further pair of vacuum tubes including a cathode, a control grid and an anode each, means connecting said common load in push-pull relationship to the control grids of the tubes of said further pair, a bias source coupled to the control grids of said further pair of biasing class-B, a tuned circuit tuned to four times the frequency of said source, a resistance-capacity network coupled to each of the anodes of said further pair and connecting said anodes to said tuned circuit in push-pull relation, and means for radiating the signal energy present in said tuned circuit; means for receiving the radiated energy including a second tuned circuit, a pair of vacuum tubes each including a control grid and an anode, a resistance-capacity network coupling said second tuned circuit to said last mentioned control grids in push-pull relation, a third tuned circuit, a resistance-capacity network coupling said last-mentioned anodes to said third tuned circuit in push-pull relation, and detecting means coupled in push-pull relation to said third tuned circuit.

3. A modulating device for signal modulating a radio frequency comprising two pairs of vacuum-tubes each having a cathode, at least one grid and one anode, a radio frequency input circuit, a modulating signal input circuit, means connecting said radio frequency input circuit to the grids of said pair of tubes for applying the radio frequency to the grids of each pair of said tubes in opposite polarity and phase shifting means for applying the radio frequency to the grids of the first pair of said tubes and the second pair of said tubes so that the currents fed to the first pair of tubes will be ninety degrees out of phase with the currents fed to the second pair of tubes, a bias source coupled to said grids, means connecting said modulating signal input circuit to the grids of all of said tubes for applying the modulating signal to the grids of all of said tubes co-phasally, and resistance-capacity coupled means connected to the anodes of each pair of said tubes for combining the radio frequency portions repeated by each tube and conveying the signal modulated radio frequency currents in opposite polarity to the grids of a push-pull class-B amplifier.

JULIUS HARTZ.

References Cited in the file of this patent

UNITED STATES PATENTS

| Number | Name | Date |
|---|---|---|
| 1,868,339 | Trautwein | July 19, 1932 |
| 1,889,293 | Robinson | Nov. 29, 1932 |
| 1,892,383 | Chireix | Dec. 27, 1932 |
| 1,909,981 | Osmos | May 23, 1933 |
| 1,924,469 | Strecker | Aug. 29, 1933 |
| 1,935,776 | Hammond | Nov. 21, 1933 |
| 1,976,393 | Hammond | Oct. 9, 1934 |
| 2,173,145 | Wirkler | Sept. 19, 1939 |
| 2,253,575 | Norton | Aug. 26, 1941 |
| 2,256,317 | Earp | Sept. 16, 1941 |
| 2,285,372 | Strutt et al. | June 2, 1942 |
| 2,291,978 | Mouradian | Aug. 4, 1942 |
| 2,296,107 | Kimball | Sept. 15, 1942 |
| 2,301,907 | Pieracci | Nov. 10, 1942 |
| 2,323,672 | Nelson | July 6, 1943 |
| 2,347,458 | Brown | Apr. 25, 1944 |
| 2,347,459 | Goetter | Apr. 25, 1944 |
| 2,370,637 | Charchian | Mar. 6, 1945 |
| 2,382,693 | Dallenbach | Aug. 14, 1945 |
| 2,393,706 | Romander | Jan. 29, 1946 |
| 2,400,133 | Pray | May 14, 1946 |
| 2,440,465 | Ferguson | Apr. 27, 1948 |